W. R. PARK.
SPRING.
APPLICATION FILED SEPT. 22, 1911.
1,023,870.
Patented Apr. 23, 1912.
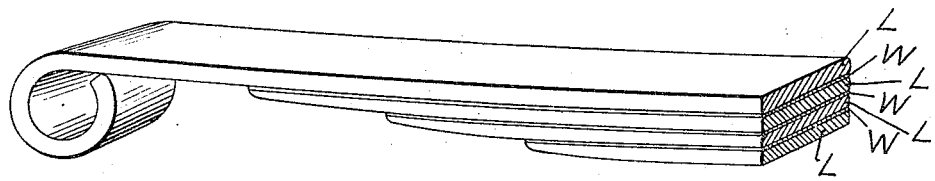
Witnesses:
Inventor:
William R. Park

UNITED STATES PATENT OFFICE.

WILLIAM R. PARK, OF TAUNTON, MASSACHUSETTS, ASSIGNOR TO HIMSELF, AS TRUSTEE.

SPRING.

1,023,870.  Specification of Letters Patent.  Patented Apr. 23, 1912.

Application filed September 22, 1911. Serial No. 650,819.

*To all whom it may concern:*

Be it known that I, WILLIAM R. PARK, a citizen of the United States, and resident of Taunton, in the county of Bristol and State of Massachusetts, have invented new and useful Improvements in Springs, of which the following is a specification.

My invention relates to the construction of springs for vehicles, and has for its object the provision of springs which, while capable of yielding to road shocks, will do so with a retarded or sluggish response, so as to avoid the disagreeable and sometimes damaging "bounce", which many persons have experienced, and which has stimulated inventors to contrive "shock absorbers" of miscellaneous construction, all of which may contribute a measure of relief to the occupants of the vehicle, but which involve the disadvantages of extra equipment with its added complication and weight.

I have invented and herein describe, a vehicle spring which in itself possesses all the functional capacities of the shock absorber, and at the same time affords all the advantages of the ordinary well constructed vehicle spring.

The drawing hereto annexed which shows in perspective and cross section the end of a vehicle spring, illustrates my invention.

I take an ordinary vehicle spring composed of a sheaf of steel spring-leaves to be assembled in the usual manner. Before assembling the spring leaves L, I warm them to a temperature high enough to melt wax—such as beeswax,—and coat the surfaces of the leaves evenly with a film of wax. This may be done by dipping the leaves in melted wax, or by any mode which insures the eventual spreading of the wax film evenly on the metal surface. The spring leaves are then assembled in the usual way, with the wax films W between adjacent leaves.

Wax, such as beeswax, is possessed of lubricating qualities of a low order, will prevent two surfaces in contact from sticking or chattering when slid one over the other, while allowing a smooth but sluggish movement. In a vehicle spring provided with wax films as above described, the effect of the wax is to retard the response of the spring to sudden shock, and to give the vehicle suspended on the springs that smooth undulating movement which has been the object of all the contrivers of shock absorbers. Moreover, the wax retardant between the spring-leaves is preservative of the metal, and prevents the spring from squeaking. It does not prevent the spring from flexing under steady load to the same extent as it would without the wax-films, but causes the spring to lag in its response to sudden and violent stresses.

Wax applied to smooth steel surfaces in the manner above described, remains closely adherent to the metal and will not be disturbed or removed by friction, even after long service. To be sure, any surplus of wax will at first be rubbed off and squeezed out from between the spring leaves, but the effective wax film remains and will perform service for an indefinitely long time.

What I claim and desire to secure by Letters Patent is:

A vehicle spring composed of resilient leaves in sliding contact with each other, having a film of wax between adjacent leave.

Signed by me at Boston, Massachusetts, this 18th day of September, 1911.

WILLIAM R. PARK.

Witnesses:
 ODIN ROBERTS,
 CHARLES D. WOODBERRY.